United States Patent
Mahaffy

(10) Patent No.: US 8,061,671 B2
(45) Date of Patent: Nov. 22, 2011

(54) REPOSITIONABLE RECEPTACLES

(75) Inventor: Jennifer J. Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 213 days.

(21) Appl. No.: 12/323,052

(22) Filed: Nov. 25, 2008

(65) Prior Publication Data

US 2010/0127146 A1   May 27, 2010

(51) Int. Cl.
*A47B 96/06*  (2006.01)
*A47C 7/62*   (2006.01)
*A47F 7/00*   (2006.01)

(52) U.S. Cl. .......... 248/311.2; 248/222.12; 248/223.41; 297/188.21; 297/188.2

(58) Field of Classification Search ............... 211/94.02, 211/94.01, 162; 40/652; 248/222.12, 450, 248/223.41, 311.2; 411/546; 297/188.21, 297/188.2, 188.14
See application file for complete search history.

(56) References Cited

U.S. PATENT DOCUMENTS

| | | | |
|---|---|---|---|
| 2,673,591 A * | 3/1954 | Cox | ............ 297/188.14 |
| 3,939,986 A | 2/1976 | Pierro | |
| 5,743,414 A * | 4/1998 | Baudino | ............ 211/69.1 |
| 6,554,364 B1 | 4/2003 | Dammermann et al. | |
| 6,561,117 B1 | 5/2003 | Kell | |
| 6,945,414 B1 | 9/2005 | Stevens et al. | |
| 7,104,580 B2 | 9/2006 | Clark et al. | |
| 7,152,897 B2 | 12/2006 | Bonnes et al. | |
| 2003/0122392 A1 | 7/2003 | Larsen et al. | |
| 2003/0197392 A1 | 10/2003 | Clark et al. | |
| 2008/0079278 A1 | 4/2008 | Rajappa et al. | |
| 2008/0245753 A1 * | 10/2008 | Spriegel et al. | ............ 211/85.7 |

\* cited by examiner

*Primary Examiner* — Milton Nelson, Jr.
(74) *Attorney, Agent, or Firm* — Dinsmore & Shohl LLP

(57) ABSTRACT

A system for adjustably positioning an accessory may include a track and an accessory removably coupled to the track. The track may include an upper portion and a lower portion defining a channel therebetween. The upper portion may include an upper flexible segment extending along a length of the channel wherein the upper flexible segment is outwardly and inwardly deformable with respect to the channel. The accessory may include at least one connector extending from the accessory, the connector being removably insertable into the channel of the track by deforming the upper flexible segment with respect to the channel, the at least one connector including a substantially horizontal portion and a substantially vertical portion wherein, when the connector is inserted in the track, the substantially vertical portion of the connector secures the accessory to the track.

15 Claims, 5 Drawing Sheets

REPOSITIONABLE RECEPTACLES

TECHNICAL FIELD

The present invention generally relates to receptacles for vehicles and, more specifically, to repositionable receptacles for vehicle interiors.

BACKGROUND

A vehicle passenger often desires access to a multitude of objects when seated in his or her seat. Receptacles, such as cup holders and the like, allow passengers to place drinks, cell phones, garage door openers and other objects as desired in a relatively stable location. The receptacles may vary in size and shape to conform with a vehicle's interior finishes while providing multiple storage outlets for a passenger. The receptacles may be disposed about a center console, a vehicle door, adjacent to a seat or at any other suitable location so that a passenger may store or retrieve objects as needed.

To provide increased flexibility, it may be desirable to provide repositionable receptacles that allow a passenger greater control over the position of his or her receptacles and the items contained therein. Enabling more freedom in locating a passenger's beverage, phone or other object will allow access to the desired object in a more convenient fashion.

Accordingly, a need exists for alternative receptacles for vehicle interiors.

SUMMARY

A system for adjustably positioning an accessory may include a track and an accessory removably coupled to the track. The track may include an upper portion and a lower portion defining a channel therebetween. The upper portion may include an upper flexible segment extending along a length of the channel wherein the upper flexible segment is outwardly and inwardly deformable with respect to the channel. The accessory may include at least one connector extending from the accessory, the connector being removably insertable into the channel of the track by deforming the upper flexible segment with respect to the channel. The at least one connector may include a substantially horizontal portion and a substantially vertical portion wherein, when the connector is inserted in the track, the substantially vertical portion of the connector secures the accessory to the track.

In another embodiment, an adjustable cup holder system may include a track and a cup holder wherein the track may include an upper portion and a lower portion defining a channel therebetween. The upper portion may include an upper flexible segment and the lower portion may include a lower flexible segment, the upper flexible segment and the lower flexible segment extending along a length of the channel and being outwardly and inwardly deformable with respect to the channel. The cup holder may include a connector extending from the cup holder, the connector being removably insertable into the channel of the track by deforming the upper flexible segment and the lower flexible segment with respect to the channel. The connector may include a substantially horizontal portion and a substantially vertical portion oriented in a T configuration wherein, when the connector is inserted in the track, the substantially vertical portion of the connector secures the cup holder to the track.

In yet another embodiment, a vehicle seat may include a seat back, a seat bottom and an adjustable receptacle system may include at least one track. The at least one track may include an upper portion and a lower portion defining a channel therebetween. The upper portion may include an upper flexible segment extending along a length of the channel wherein the upper flexible segment is outwardly and inwardly deformable with respect to the channel. The receptacle may include at least one connector extending from the receptacle, the connector being removably insertable into the channel of the track by deforming the upper flexible segment with respect to the channel. The at least one connector may include a substantially horizontal portion and a substantially vertical portion wherein, when the connector is inserted in the track, the substantially vertical portion of the connector secures the receptacle to the track. The at least one track may be disposed about a periphery of the vehicle seat.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
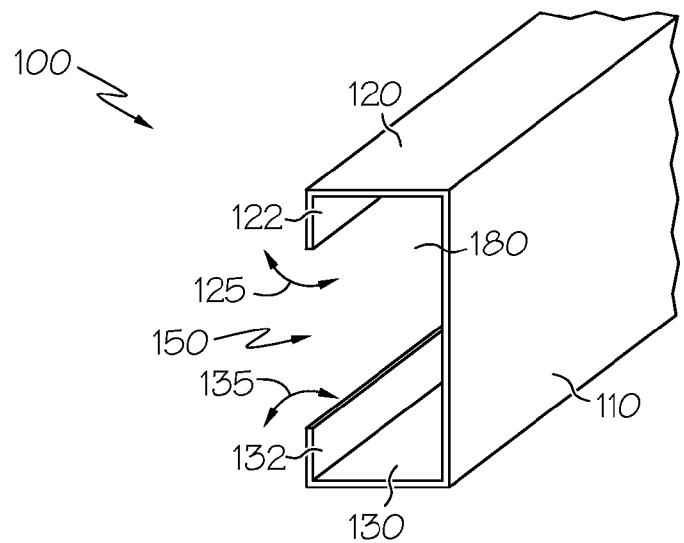
FIG. 1 depicts a track according to one or more embodiments shown and described herein.
Figure 2:
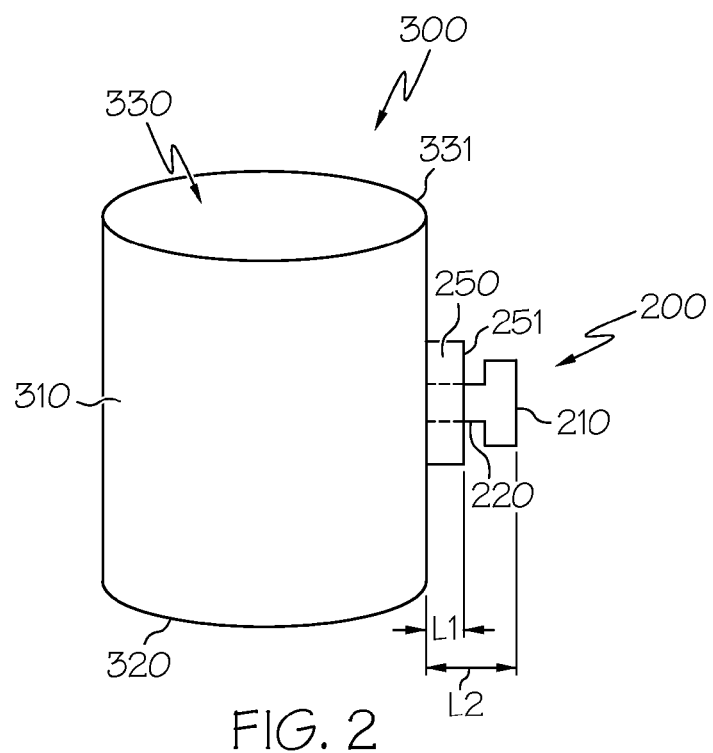
FIG. 2 depicts a side view of a connector supported receptacle according to one or more embodiments shown and described herein.

FIG. 1 and FIG. 2 generally depict one embodiment of an adjustable receptacle system for adjustably coupling a receptacle to a track. The system generally comprises a track and a receptacle with a connector attached thereto. The track may comprise a channel with flexible segments that are outwardly and inwardly deformable relative to the track to receive the connector. The connector may comprise a substantially horizontal portion connected to a substantially vertical portion so that the substantially vertical portion may be inserted in the channel and thereby detachably couple the receptacle to the track. Various embodiments will be described in more detail herein.

Referring now to FIG. 1, a track 100 may generally comprise an upper portion 120 and a lower portion 130 forming a channel 180 with an opening 150. The track may further comprise a back wall 110 connecting the upper portion 120 and the lower portion 130. Generally the upper portion and lower portion may extend in a substantially parallel fashion for a common length as depicted in FIG. 1. However, the upper portion and lower portion may, in the alternative, extend in diverging directions or extend for unequal lengths.

The upper portion 120 and/or the lower portion 130 may comprise a flexible segment extending along at least a portion of the length of the channel 150. An upper flexible segment 122 and a lower flexible segment 132 may be outwardly and inwardly deformable (as shown by arrows 125 and 135 respectively) with respect to the channel 180 so that they may flexibly receive a connector (not shown). While FIG. 1 depicts both an upper flexible segment 122 and a lower flexible segment 132 to flexibly receive a connector, the track may, in the alternative, comprise a single flexible segment at either the upper portion 120 or lower portion 130.

In an exemplary embodiment, the track may be made of a flexible polymeric material that flexibly deforms and returns to its original position without cracking or breaking. Other materials capable of engaging the connector may alternatively be used.

Figure 3:
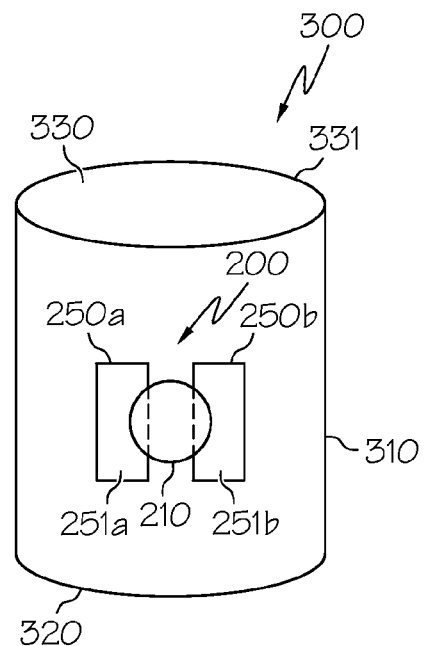
FIG. 3 depicts a front view of a connector supported receptacle according to one or more embodiments shown and described herein.

Referring now to FIGS. 1-3, a connector 200 (shown in cross section) generally comprises a substantially horizontal portion 220 connected to a substantially vertical portion 210. The substantially vertical portion 210 may take on a number of shapes including, but not limited to circular, cylindrical, square, rectangular, spherical or the like such that the connector generally comprises a substantially horizontal component and a substantially vertical component in cross-section. Likewise, the substantially horizontal portion 220 may take on a number of shapes. In one exemplary embodiment, the substantially horizontal portion 220 may be substantially square in cross section to prevent rotation of the connector when attached to the track. In another exemplary embodiment, the vertical portion 210 and horizontal portion 220 form a connector 200 that is substantially "T" shaped in cross-section. However, it should be understood that other configurations may be possible. For example, the substantially horizontal portion and the substantially vertical portion may comprise a connector that is substantially "L" shaped in cross-section.

The connector 200 may be made of a material more rigid than that of the upper flexible segment 122 and lower flexible segment 132 so that the connector 200 may deform the flexible segments inward and outward as the connector 200 is inserted into or removed from the track 100. In one exemplary embodiment, the substantially vertical portion 210 and substantially horizontal portion 220 are formed of an injection molded polymer with sufficient rigidity to easily deform the upper flexible segment 122 and lower flexible segment 132 when entering or exiting the track 100.

Figure 4A:
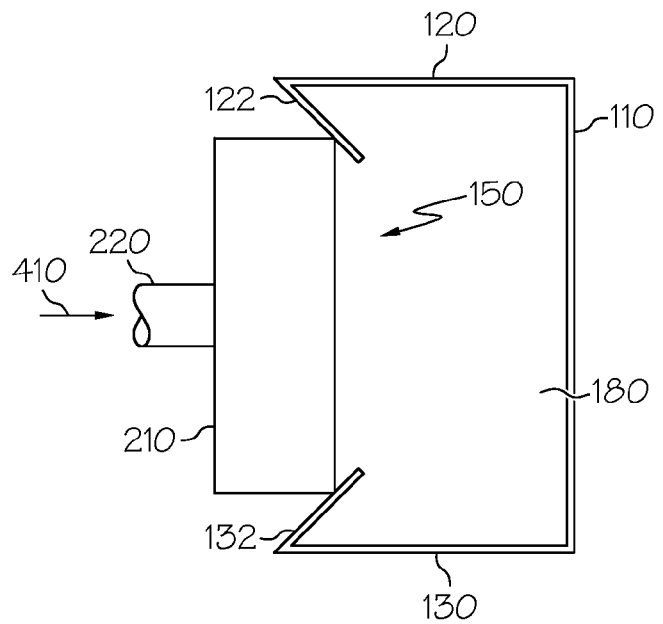
FIGS. 4A and 4B depict a connector being inserted and removed from a track according to one or more embodiments shown and described herein.
Figure 4B:
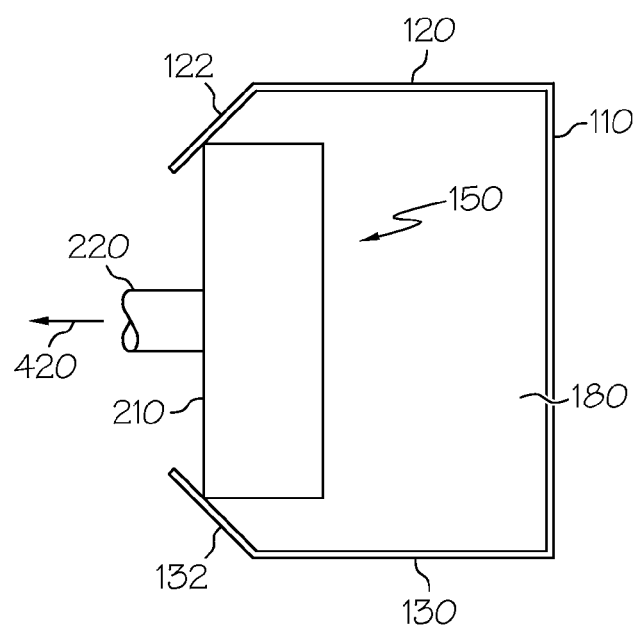

For examples, referring to FIGS. 4A and 4B, a connector 200 may be inserted into and removed from the channel 180 of a track 100 through an opening 150. In one embodiment, as the connector is inserted (shown by arrow 410) into the track 100, the substantially vertical portion 210 contacts and displaces the upper flexible segment 122 and the lower flexible segment 132 so that they deform or flex inwards to allow the substantially vertical portion 210 to enter the channel 180. Subsequently, when the connector 200 is removed (shown by arrow 420) from the track 100, the substantially vertical portion 210 contacts and moves the upper flexible segment 122 and the lower flexible segment 132 so that they deform or flex outwards to allow the connector 200 to exit the track 100.

Figure 5A:
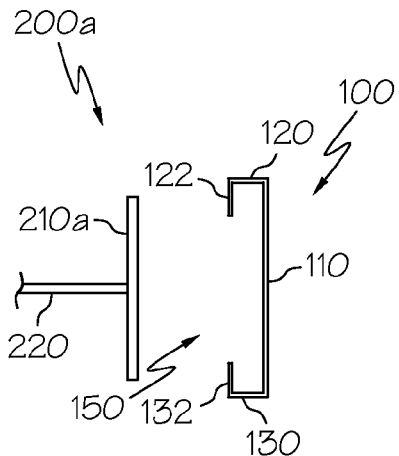
FIGS. 5A-5C depict alternative connector-track configurations according to one or more embodiments shown and described herein.
Figure 5B:
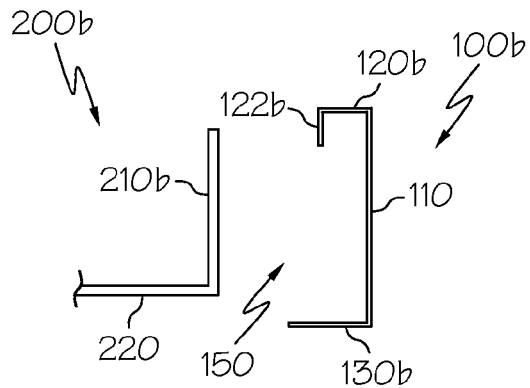
Figure 5C:
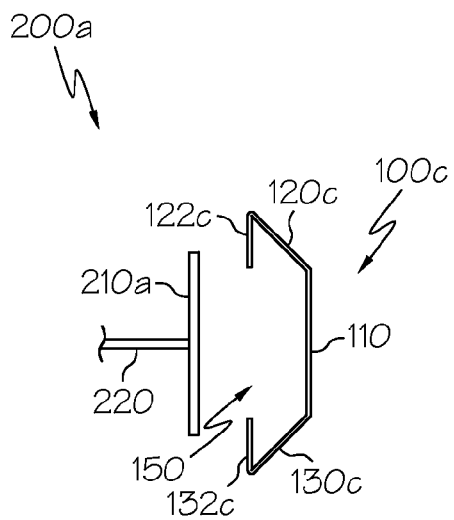

Referring now to FIGS. 5A-5C, multiple other alternative embodiments of the connector and channel are shown with varying configurations between the substantially vertical portion 210 and the substantially horizontal portion 220. FIG. 5A depicts an alternative embodiment wherein a thin-walled substantially vertical portion 210a and substantially horizontal portion 220 are generally "T" shaped in cross section. The track 100 comprises a back wall 110 connecting an upper portion 120 and a lower portion 130 extending in substantially the same direction with respect to the back wall 110. The upper portion 120 connects to an upper flexible segment 122 and the lower portion 130 connects to a lower flexible segment 132. The thin-walled "T" shaped connector 200a is configured to enter and exit the track 100 via the opening 150.

FIG. 5B depicts an alternative embodiment wherein the substantially vertical portion 210b and substantially horizontal portion 220 are substantially "L" shaped in cross section. The substantially horizontal portion 220 connects to one end, or close to one end, of the substantially vertical portion 210b so that a majority of the substantially vertical portion 210b is disposed about one side of the substantially horizontal portion 220. The track 100b comprises an upper portion 120b configured to receive the open end of the connector 200b and a lower portion 130b configured to receive the closed end of the connector 200. The upper portion 120b may connect to an upper flexible segment 122b to flexibly receive the connector 200b.

FIG. 5C depicts an alternative embodiment wherein a connector having a "T" shaped cross section is combined with track 100c which comprises an upper portion 120c with an upper flexible segment 122c and lower portion 130c with a lower flexible segment 132c that extend from a back wall 110 in diverging directions. In another alternative embodiment, the track 100 may be substantially "C" shaped wherein the upper portion 120 seamlessly transitions into the lower portion 130 creating a smooth curved track with no clearly definable junctures.

Referring to FIG. 2 and FIG. 3, the connector 200 may be connected to a receptacle 300 comprising a top portion 331 and a bottom portion 320 interconnected by at least one side wall 310. The bottom portion 320 may be substantially enclosed while the top portion 331 may comprise an opening 330. The side wall 310 may be formed such that the side wall 310 is substantially solid. Alternatively, the side wall 310 may be perforated, such as when the side wall 310 comprises a plurality of holes or openings passing through the side wall 310. For example, the side wall 310 may comprise a cage-like structure having a plurality of rectangular or square openings extending through the side wall 310. The connector 200 may connect to the receptacle 300 on the side wall 310. The receptacle may be substantially cylindrical, rectangular or any other configuration such that a multitude of object such as drinks, bottles, cellular phones, keys, garage door openers, and the like, may be positioned in the receptacle. In one exemplary embodiment, the receptacle 300 may be substantially cylindrical, such as when the receptacle is a cup holder. In another embodiment, a side of the receptacle on which the connector 200 is disposed may be substantially flat to minimize the distance the receptacle 330 extends away from the track 100.

In the alternative, the connector 200 may be attached to an alternative accessory such as a cup holder, mesh pouch, MP3 holder or other receptacle or container. In one exemplary embodiment, the connector 200 may connect to a hook or hook-like device that one may hang or attach items on such as keys, jewelry or similar items. In another exemplary embodiment, the connector 200 may be directly connected to an object such as a cell phone or garage door opener (or a case which encloses a cell phone or garage door opener) so that the object itself may be removably coupled with the track 100. Accordingly, it should be understood that the connector as described herein may be attached to a variety of different accessories such that the accessory may be removably attached to the track 100.

As shown in FIG. 2, a stopper 250 may also be connected to the receptacle 300 or receptacle alternative. The stopper 250 may connect to the receptacle 300 proximate the connector 200 to assist in engaging the track 100. The stopper may extend away from the receptacle 300 for a stopper length L1 that is less than the connector length L2 to form a gap between the substantially vertical portion 200 and the stopper 250 such that the upper flexible portion 122 and/or the lower flexible portion 132 may be received into the gap when the receptacle is attached to the track. Furthermore, the face of the stopper 251 may comprise a substantially flat surface facing the same direction as the substantially vertical portion 210 and operable to rest against the outside surface of the track 100. In the alternative, a compressible foam stopper may extend past the connector 200. In such an embodiment, the foam would compress when pushed against the track 100 so that the connector 200 may extend past the stopper 250 and engage the track 100.

Figure 6:
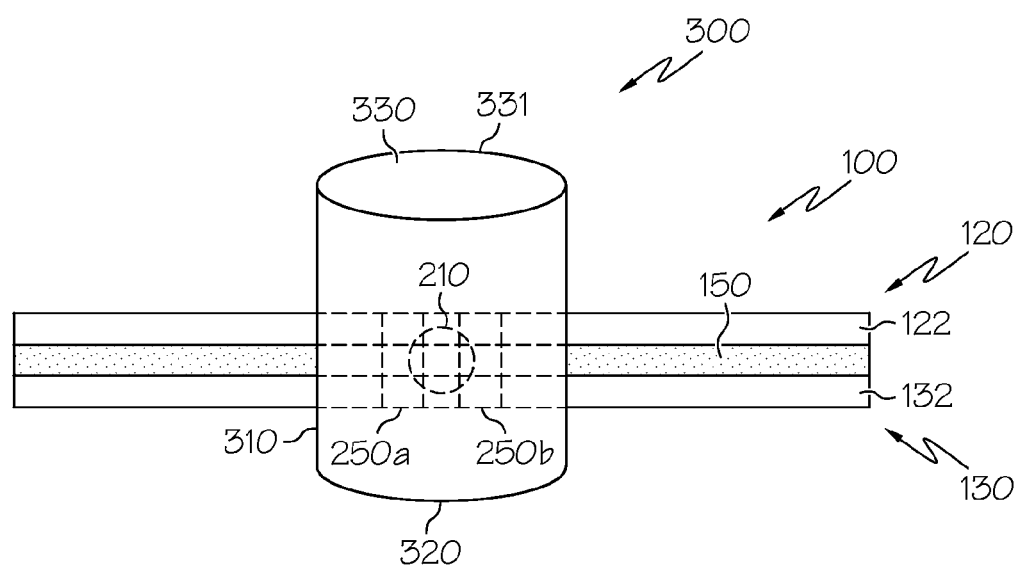
FIG. 6 depicts a back view of a connector supported receptacle connected to a track according to one or more embodiments shown and described herein.

Referring to FIG. 6, in another exemplary embodiment, the stopper 250 may encompass the substantially horizontal portion 220 in a circular fashion. In the alternative, as seen in FIG. 3, a first side stopper 250a and a second side stopper 250b may surround the connector 200 so that the substantially vertical portion 210 is disposed between the first side stopper 250a and the second side stopper 250b. In such an embodiment, the face of the first side stopper 251a and the face of the second side stopper 251b may face in a substantially similar direction such that they contact the track 100 in a single plane. The stopper 250 may be made of a soft foam or rubber material that allows some give when pushed against a track 100 and may also frictionally engage the periphery of the track 100 to prevent the attached receptacle from sliding with respect to the track 100.

Figure 7:
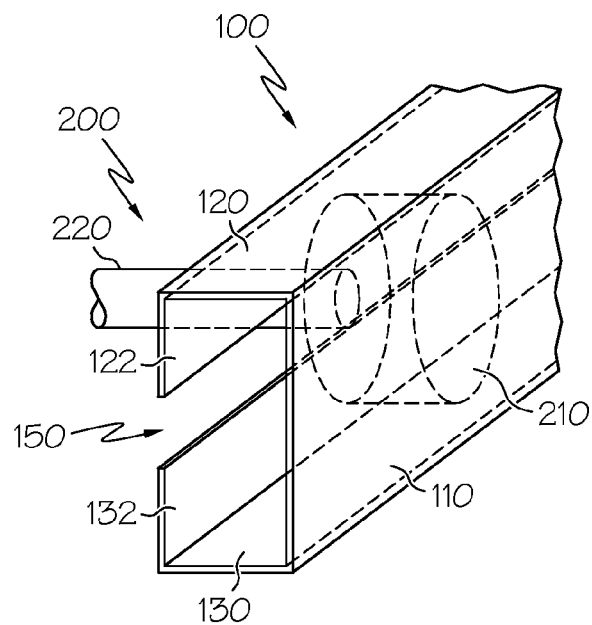
FIG. 7 depicts a connector connected to a track according to one or more embodiments shown and described herein.
Figure 8:
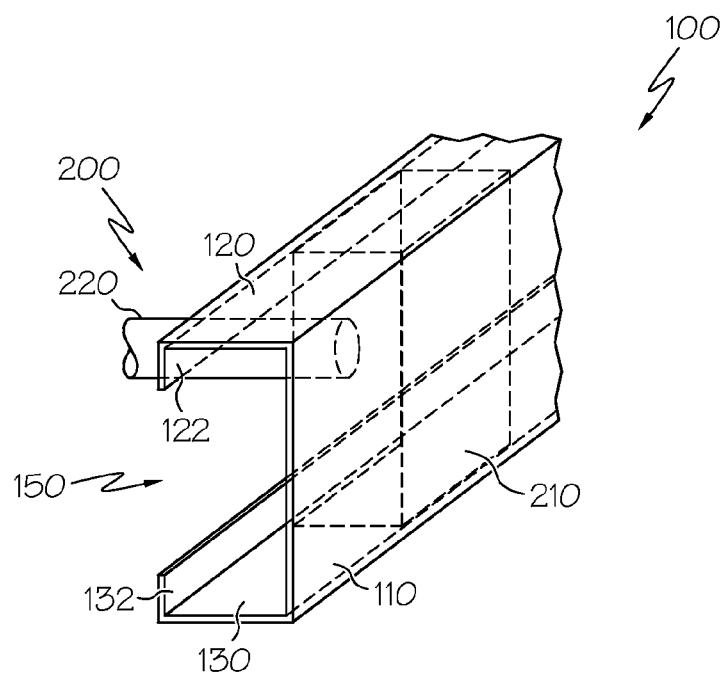
FIG. 8 depicts a connector connected to a track according to one or more embodiments shown and described herein.

Referring now to FIGS. 6-8, the connector 200 may removably couple a receptacle 300 or alternative item/accessory to a track 100 by being pushed into the channel 180 through the opening 150. When the connector 200 is inserted in the channel 180, the upper portion 120 and lower portion 130 enclose the substantially vertical portion 210 in the track 100. A back wall 110 may further secure the connector 200 and limit how deep the connector 200 may be inserted into the track 100. When inserted or removed, the upper flexible segment 122 and/or the lower flexible segment 132 flex inwardly or outwardly (e.g., as shown in FIGS. 4A and 4B) to receive or release the substantially vertical portion 210 of the connector 200. The substantially vertical portion 210 of the connector 200 thereby secures the receptacle 300 to the track 100. In one exemplary embodiment, the front of the first side stopper 251a and the front of the second side stopper 251b engage the upper flexible portion 122 and the lower flexible portion 132 to further aid in connection. The first side stopper 250a and second side stopper 250b may frictionally engage the surface of the track 100 to restrict or prevent sliding of the receptacle along the track 100 and limit how far the connector 200 may be inserted into the track 100.

The track 100 may further extend for a length with the channel 180 and opening 150 extending for some or all of that length. The track 100 may be substantially uniform in configuration along the length to allow connection of the connector and accessory anywhere along the length of the track 100. The track 100 may also extend for a length adequate to receive two or more connectors 200 or accessories simultaneously so that multiple receptacles, accessories, or combinations thereof, may be removably coupled to the track 100 at the same time.

As discussed above, the substantially vertical portion 210 and substantially horizontal portion 220 of the connector 200 may take on various configurations. FIG. 7 depicts an exemplary embodiment wherein the substantially vertical portion 210 is substantially cylindrical or circular. The cylindrically shaped substantially vertical portion 210 enters and exits the track 200 through the opening 150. The upper flexible segment 122 and the lower flexible segment 133 deform to receive and release the connector 200 when the connector is inserted or extracted from the track 100. When connected, the substantially vertical portion rests between the upper portion 120 and lower portion 130 to secure an accessory (not shown) attached to the substantially horizontal portion 220. FIG. 8 depicts another alternative embodiment where the substantially vertical portion 210 is substantially square shaped.

Figure 9:
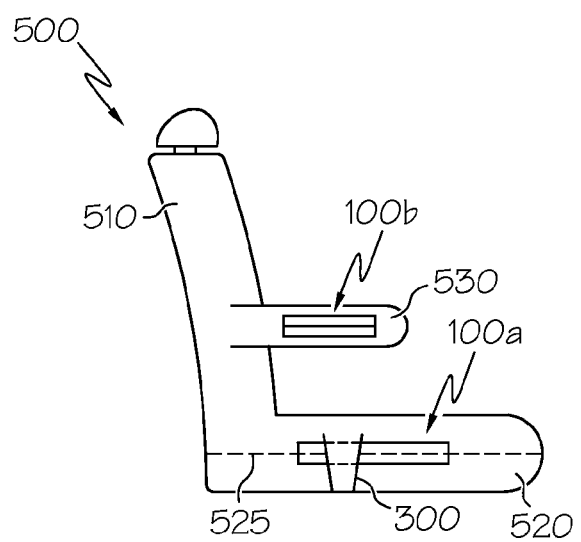
FIG. 9 depicts a vehicle seat with possible track locations according to one or more embodiments shown and described herein.

Referring now to FIG. 9, a vehicle seat 500 comprises a seat back 510 connected to a seat bottom 520. In one embodiment, an arm rest 530 may be connected to the seat back 510 as shown or, in the alternative, the seat bottom 520. In addition, a seam 525 may be disposed in one more locations about the vehicle seat 500 and connect two or more portions of a flexible covering disposed over the seat. One or more tracks 100a, 100b may be disposed in multiple locations such as a first track 100a connected to the seat bottom 520 and a second track 100b connected to the arm rest 530. In one embodiment the tracks 100a, 100b may be disposed in the seat beneath the flexible covering such that the opening 150 in the channel 180 is disposed along the seam. In another embodiment, the tracks may be affixed to the surface of the vehicle seat 500 by way of adhesives, screws, bolts, fasteners or the like. In one exemplary embodiment, multiple tracks are connected to a vehicle seat wherein the tracks possess a substantially common configuration so that the same or similarly shaped connector may connect to any track such that a receptacle 300 or other connector attachment may be removably coupled about a variety of locations according to a passenger's preference. Tracks may also be disposed elsewhere in a vehicle interior such as along the inside of a door, a dashboard or a center console.

Accordingly it will be understood that the track and connector described herein may be used in conjunction with a vehicle seat or other interior vehicle surface. The connector may be connected to a cup holder, receptacle or other accessory so that a passenger may detachably connect the cup holder, receptacle or other accessory about the length of one or more tracks thereby positioning the cup holder, receptacle or other accessory in a desired and/or convenient location.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A system for adjustably positioning an accessory, the system comprising a track and an accessory removably coupled to the track, wherein:
    the track comprises an upper portion and a lower portion defining a channel there between, the upper portion comprising an upper flexible segment extending along a length of the channel, wherein the upper flexible segment is outwardly and inwardly deformable with respect to the channel; and
    the accessory comprises at least one connector extending from the accessory, the connector being removably insertable into the channel of the track by deforming the upper flexible segment with respect to the channel, the at least one connector comprising a substantially horizontal portion and a substantially vertical portion, wherein, when the connector is inserted in the track, the substantially vertical portion of the connector secures the accessory to the track, wherein the accessory further comprises a compressible foam stopper connected to the accessory proximate the connector and extending away from the accessory for a stopper length less than a connector length.

2. The system of claim 1 wherein:
    the lower portion of the track further comprises a lower flexible segment extending along a length of the channel, wherein the lower flexible segment is outwardly and inwardly deformable with respect to the channel;
    the substantially vertical portion and the substantially horizontal portion of the at least one connector are oriented in a T configuration; and
    the connector is removably insertable into the channel of the track by deforming the upper flexible segment and the lower flexible segment with respect to the channel.

3. The system of claim 1 wherein the track further comprises a back wall connecting the upper portion and the lower portion.

4. The system of claim 1 wherein the accessory is a receptacle with an opening.

5. The system of claim 1 wherein the accessory is a hook.

6. A system for adjustably positioning a receptacle, the system comprising a track and the receptacle removably coupled to the track, wherein:
    the track comprises an upper portion and a lower portion defining a channel there between, the upper portion comprising an upper flexible segment extending along a length of the channel, wherein the upper flexible segment is outwardly and inwardly deformable with respect to the channel; and
    the receptacle comprises a top portion and a bottom portion interconnected by at least one side wall, wherein the top portion comprises an opening and the bottom portion is substantially enclosed so that an object may rest within the receptacle by entering through the top portion and being supported by the bottom portion, and wherein the receptacle comprises at least one connector extending from the receptacle, the connector being removably insertable into the channel of the track by deforming the upper flexible segment with respect to the channel, the at least one connector comprising a substantially horizontal portion and a substantially vertical portion, wherein, when the connector is inserted in the track, the substantially vertical portion of the connector secures the receptacle to the track.

7. The system of claim 6 wherein:
    the lower portion of the track further comprises a lower flexible segment extending along a length of the channel, wherein the lower flexible segment is outwardly and inwardly deformable with respect to the channel;
    the substantially vertical portion and the substantially horizontal portion of the at least one connector are oriented in a T configuration; and
    the connector is removably insertable into the channel of the track by deforming the upper flexible segment and the lower flexible segment with respect to the channel.

8. The system of claim 6 wherein the track further comprises a back wall connecting the upper portion and the lower portion.

9. The system of claim 6 wherein the receptacle further comprises a stopper connected to the receptacle proximate the connector and extending away from the receptacle for a stopper length less than a connector length.

10. The system of claim 9 wherein the stopper comprises a compressible foam stopper.

11. A system for adjustably positioning an accessory, the system comprising a track and an accessory removably coupled to the track, wherein:
    the track comprises an upper portion and a lower portion defining a channel there between, the upper portion comprising an upper flexible segment extending along a length of the channel, wherein the upper flexible segment is outwardly and inwardly deformable with respect to the channel; and
    the accessory comprises at least one connector extending from the accessory, the connector being removably insertable into the channel of the track by deforming the upper flexible segment with respect to the channel, the at least one connector comprising a substantially horizontal portion and a substantially vertical portion, wherein, when the connector is inserted in the track, the substantially vertical portion of the connector secures the accessory to the track, wherein the accessory further comprises a stopper connected to the accessory proximate the connector and extending away from the accessory for a stopper length greater than a connector length.

12. The system of claim 11 wherein:
    the lower portion of the track further comprises a lower flexible segment extending along a length of the channel, wherein the lower flexible segment is outwardly and inwardly deformable with respect to the channel;
    the substantially vertical portion and the substantially horizontal portion of the at least one connector are oriented in a T configuration; and
    the connector is removably insertable into the channel of the track by deforming the upper flexible segment and the lower flexible segment with respect to the channel.

13. The system of claim 11 wherein the track further comprises a back wall connecting the upper portion and the lower portion.

14. The system of claim 11 wherein the accessory is a receptacle with an opening.

15. The system of claim 11 wherein the stopper comprises a foam stopper.

* * * * *